US008140631B2

(12) United States Patent
Czeczulin

(10) Patent No.: US 8,140,631 B2
(45) Date of Patent: *Mar. 20, 2012

(54) METHOD FOR MAILBOX MIGRATION

(75) Inventor: Nick Czeczulin, Baltimore, MD (US)

(73) Assignee: Mirapoint Software, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/534,098

(22) Filed: Jul. 31, 2009

(65) Prior Publication Data

US 2010/0011033 A1    Jan. 14, 2010

Related U.S. Application Data

(63) Continuation of application No. 10/846,619, filed on May 14, 2004, now Pat. No. 7,587,455.

(51) Int. Cl.
*G06F 15/16* (2006.01)
*G06F 15/167* (2006.01)

(52) U.S. Cl. ........................ 709/206; 709/216

(58) Field of Classification Search .................. 709/206, 709/212, 216, 204; 707/610
See application file for complete search history.

(56) References Cited

U.S. PATENT DOCUMENTS

| 5,819,272 | A  | * | 10/1998 | Benson ................................ 1/1 |
| 5,870,753 | A  |   | 2/1999  | Chang et al. |
| 6,208,717 | B1 | * | 3/2001  | Yeh et al. .................... 379/88.18 |
| 6,754,800 | B2 |   | 6/2004  | Wong et al. |
| 6,769,124 | B1 |   | 7/2004  | Schoening et al. |
| 7,065,541 | B2 | * | 6/2006  | Gupta et al. ........................ 1/1 |
| 7,185,026 | B2 | * | 2/2007  | Browning et al. ............ 707/634 |
| 7,587,455 | B2 |   | 9/2009  | Czeczulin |
| 2002/0059256 | A1 | * | 5/2002 | Halim et al. ..................... 707/10 |
| 2003/0028555 | A1 | * | 2/2003 | Young et al. .................. 707/204 |
| 2005/0165861 | A1 | * | 7/2005 | Christie et al. ................ 707/201 |
| 2005/0267938 | A1 |   | 12/2005 | Czeczulin |

OTHER PUBLICATIONS

Software Documentation for "Mailsync", Tim Culver & Tomas Pospisek, Oct. 18, 2002, 9 pgs.
Software Documentation for "Imapsync", Gilles Lamiral, pp. 1-15, Retrieved: 2004.
Co-Pending U.S. Appl. No. 10/846,619, filed May 14, 2004.
Co-Pending U.S. Appl. No. 11/675,606, filed Feb. 15, 2007.
Non-final Office Action Mailed Mar. 3, 2008 in Co-Pending U.S. Appl. No. 10/846,619, filed May 14, 2004.
Notice of Allowance Mailed May 4, 2009 in Co-Pending U.S. Appl. No. 10/846,619, filed May 14, 2004.

(Continued)

*Primary Examiner* — Brian J Gillis
(74) *Attorney, Agent, or Firm* — Rader Fishman & Grauer, PLLC

(57) ABSTRACT

A method for mailbox migration includes creating a message ID map for the source and destination mailboxes, and storing the message ID map in a migration cache file that can also hold message ID persistence and message state indicator data. A precopy operation is performed while the source mailbox is still active, thereby allowing the time consuming process of message copying to be performed without interrupting user access to email. After email access is redirected to the destination mailbox, a final update is performed to bring the destination mailbox into a fully current state. Because of the precopy operation, the amount of required updating is minimized. By performing the updating based on message data stored in the migration cache file (and extracted from the messages themselves), the speed of the final update is further enhanced, since time-consuming message or header downloading is not required.

28 Claims, 13 Drawing Sheets

OTHER PUBLICATIONS

Final Office Action Mailed Sep. 3, 2008 in Co-Pending U.S. Appl. No. 10/846,619, filed May 14, 2004.
Non-Final Office Action Mailed Feb. 27, 2008 {sic, Mar. 3, 2008} in Co-Pending U.S. Appl. No. 10/846,619, filed May 14, 2004.
Non-Final Office Action Mailed Dec. 16, 2008 in Co-Pending U.S. Appl. No. 11/675,606, filed Feb. 15, 2007.
Final Office Action Mailed Jun. 24, 2009 in Co-Pending U.S. Appl. No. 11/675,606, filed Feb. 15, 2007.
Non-Final Office Action Mailed May 26, 2010 in Co-Pending U.S. Appl. No. 11/675,606, filed Feb. 15, 2007.
Final Office Action Mailed Dec. 28, 2009 in Co-Pending U.S. Appl. No. 11/675,606, filed Feb. 15, 2007.

* cited by examiner

METHOD FOR MAILBOX MIGRATION

BACKGROUND OF THE INVENTION

1. Field of the Invention

The invention is related to email systems, and more particularly, to a method for efficiently migrating a mailbox to a new mail server.

2. Related Art

A mail server (or "email server") provides email handling for one or more users. The mail server receives and stores email messages for a particular user in one or more mailboxes that are specific to that user. It is often desirable to migrate a user's mailbox to a different mail server (e.g., to increase mail storage capacity or to upgrade server hardware/software). Mailbox migration refers to copying the messages in an existing mailbox to a new mailbox on a new mail server so that the user can access his or her email from the new mail server.

FIGS. 1A-1D depict stages in a conventional mailbox migration process. FIG. 1A depicts a conventional email system, in which a router R1 routes email messages MAIL to a mailbox MB1 on a mail server MS11. Those messages can then be accessed by a user via an email client CL1. Router R1 and email client CL1 address mailbox MB1 based on an address stored in a directory D1. Control over the process in which mailbox MB1 is migrated from (source) mail server MS11 to a (destination) mail server MS12 is provided by a control terminal T1.

In FIG. 1B, terminal T1 sends a signal LOCK to mail server MS11 to lock mailbox MB1 to prevent any interaction with the messages contained within mailbox MB1 (as indicated by the large "Xs" over the communication path between router R1 and mailbox MB1, and over the communication path between client CL1 and mailbox MB1). Then, in FIG. 1C, terminal T1 sends a command COPY to server MS11 to cause the messages in (locked) mailbox MB1 to be copied over to mail server MS12 as messages in a new mailbox MB1'.

Meanwhile, the address stored in directory D1 for mailbox MB1 is updated to reflect the address of mailbox MB1' on mail server MS12, so that both router R1 and client CL1 are directed to access mailbox MB1'. Thus, when terminal T1 sends an unlock command UNLOCK to mail server MS12, as shown in FIG. 1D, router R1 begins delivering email messages MAIL to mailbox MB1', while client CL1 provides access to the messages within mailbox MB1'.

In this manner, mailbox migration from mail server MS11 to mail server MS12 can be accomplished in a relatively straightforward manner. Unfortunately, because the user is locked out of his or her mailbox as it is being copied from mail server MS11 to mail server MS12, the conventional migration process shown in FIGS. 1A-1D can be quite disruptive to the user associated with mailbox MB1 (and mailbox MB1').

For a large mailbox, the copying step depicted in FIG. 1C can take anywhere from several hours to several days. This extended period of email downtime can be quite problematic for users that depend on continuous access to email. Other conventional mailbox migration methods typically require a similar level of downtime.

Accordingly, it is desirable to provide a method and apparatus for migrating mailboxes that minimizes disruptions in email access.

SUMMARY OF THE INVENTION

As described above, conventional mailbox migration methodologies typically require extended periods of downtime that can be problematic for users. Ideally, a mailbox migration process would cause minimal disruption to a user, while maintaining mailbox integrity (i.e., proper copies of messages and message state information as required) as much as possible.

In accordance with an aspect of the invention, a mailbox migration can precopy messages from a source mailbox to a destination mailbox while a user is still active on the source mailbox (also called an "active" mailbox). During the precopy operation, a message ID map is created that maps the message ID of each message in the source mailbox to the message ID of a corresponding message in the destination mailbox. The message ID map allows message changes in the source mailbox to be applied to the appropriate messages in the destination mailbox, thereby eliminating the need to perform a time-consuming full message copy each time the source mailbox changes. Therefore, when the user switches over to the destination mailbox, a final update to bring the destination mailbox fully up to date can be performed very rapidly, thereby effectively creating a "low-downtime" mailbox migration from the user's perspective.

According to an embodiment of the invention, message ID persistence indicators (i.e., indicators for whether the message IDs have been reassigned) and message status indicators (i.e., indicators for certain message conditions, such as whether the message has been read, answered, or deleted) can be stored along with the message ID map to facilitate harmonization of the destination mailbox to the source mailbox. By comparing the actual mailbox data (message IDs, persistence indicators, and/or message status indicators taken directly from the mailboxes) with the stored data (message ID map and any additional persistence indicators and/or status indicators stored in a memory cache), the appropriate actions for the existing mailbox states can be taken to minimize any effects on mailbox integrity, thereby effectively creating a "low-impact" mailbox migration. Because this comparison can be performed using data readily extracted from messages, rather than the messages themselves, the comparison operation and any subsequent action can be performed very efficiently.

These and other aspects of the invention will be more fully understood in view of the following description of the exemplary embodiments and the drawings thereof.

DETAILED DESCRIPTION

The long downtimes required by conventional mailbox migration methodologies can be problematic for email users. It is desirable to provide a mailbox migration process that minimizes any interruptions to email access, while also maintaining mailbox integrity (i.e., proper copies of messages and message state information as required) as much as possible.

Figure 1A:
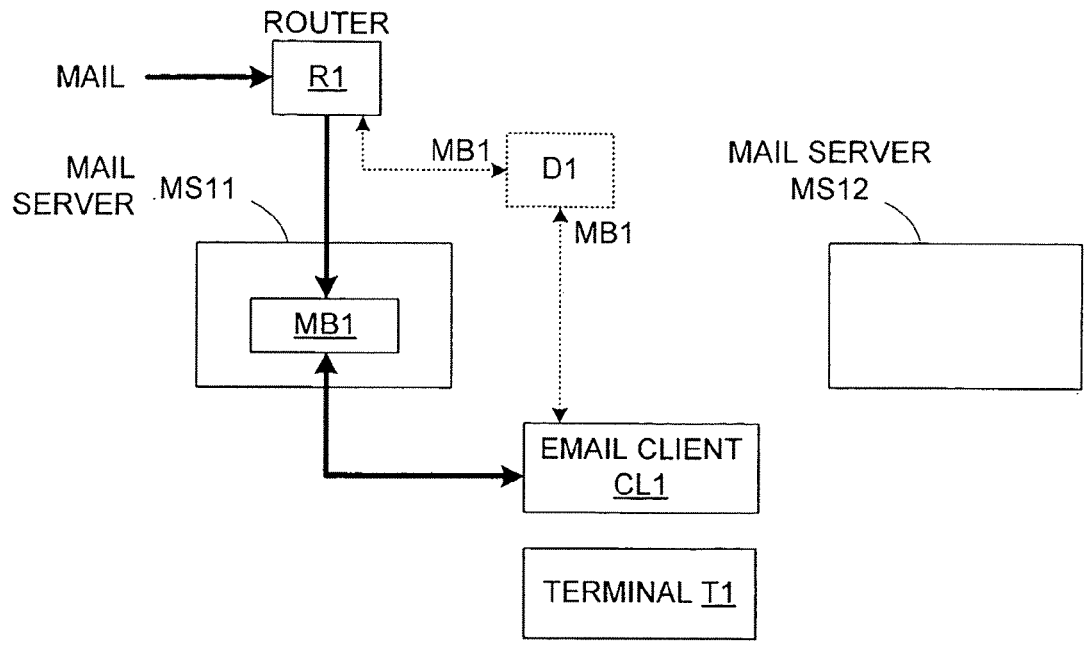
FIGS. 1A, 1B, 1C, and 1D are stages in a conventional mailbox migration methodology.
Figure 1B:
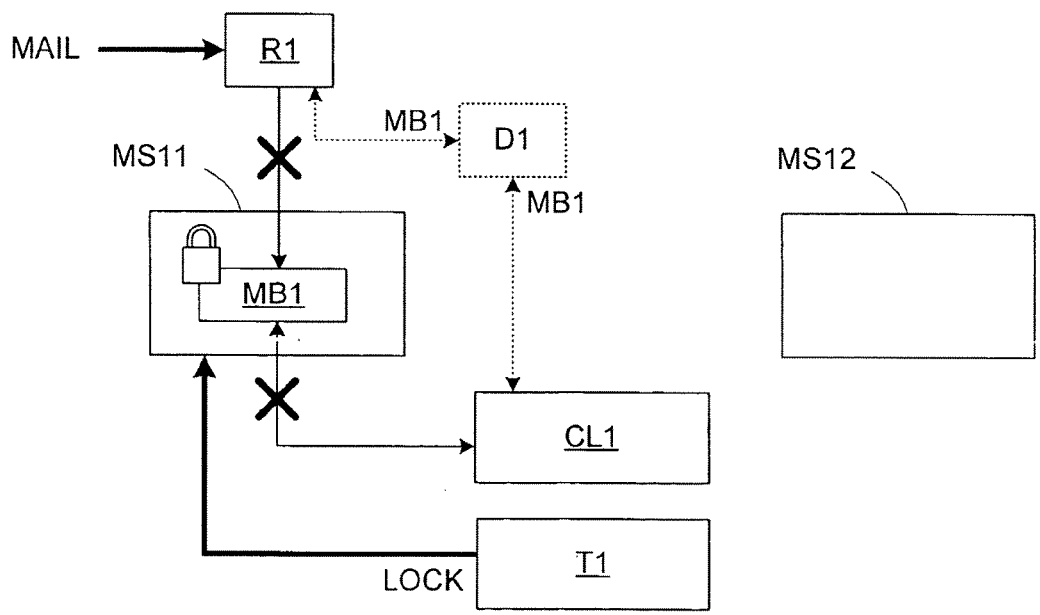
Figure 1C:
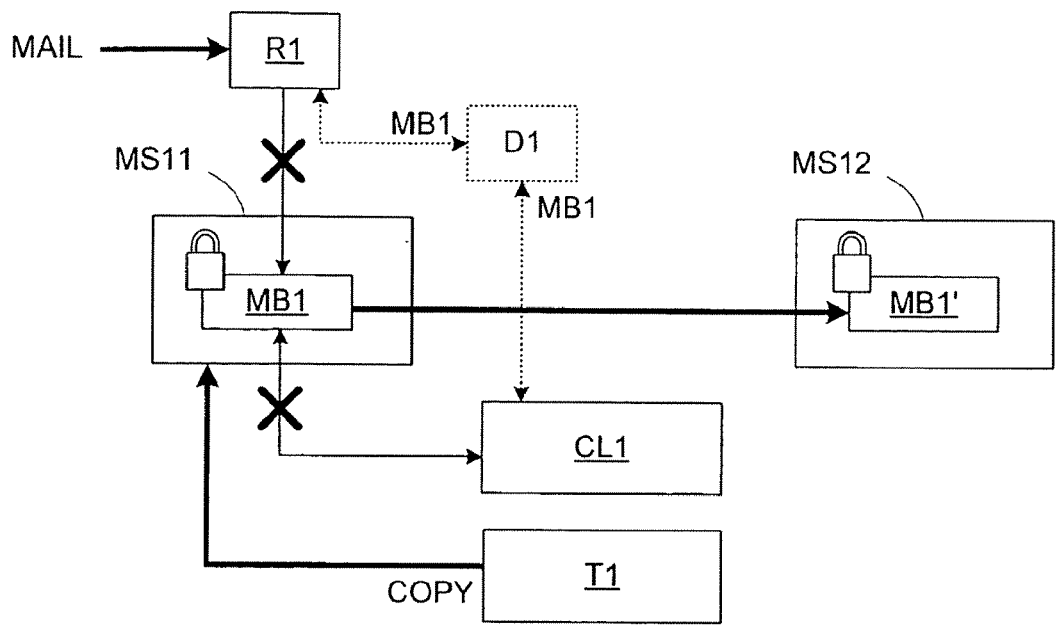
Figure 1D:
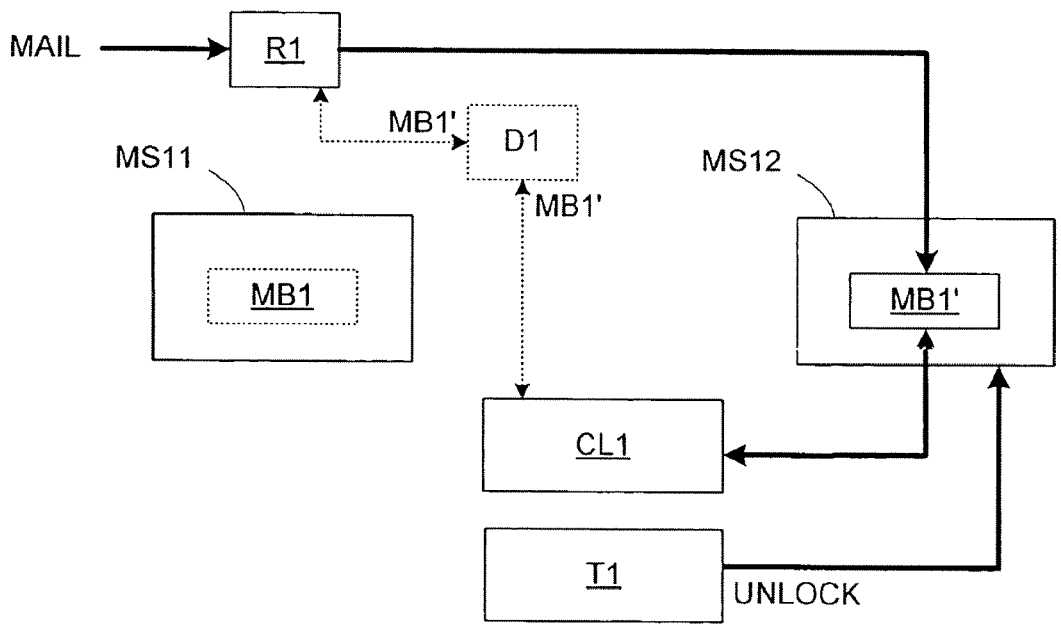
Figure 2A:
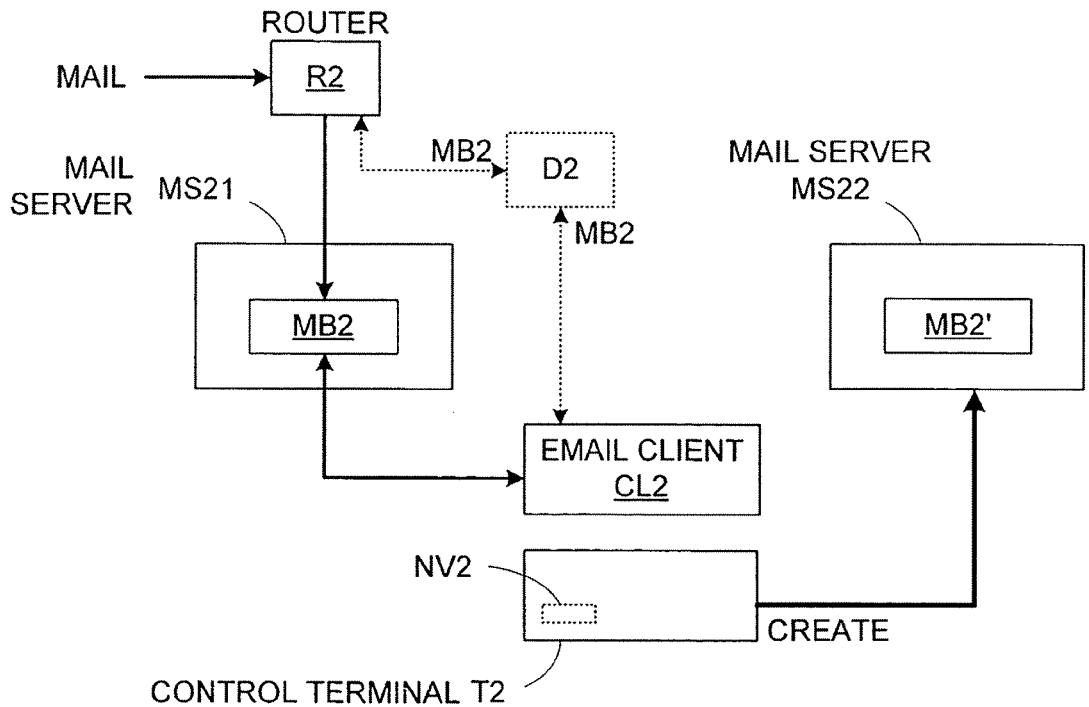
FIGS. 2A, 2B, 2C, 2D, 2E, and 2F are stages in a low-downtime mailbox migration methodology.

FIGS. 2A, 2B, 2C, 2D, 2E, and 2F show stages in a low-downtime mailbox migration methodology. FIG. 2A depicts a router R2, a source mail server MS21, a destination mail server MS22, an email client CL2, and a control terminal T2. Control terminal T2 can comprise any system for applying commands to mail servers MS21 and MS22 (e.g., a personal computer, a thin client, or even an application running on mail server MS21 or MS22). According to one embodiment, the operation of control terminal T2 during the migration operation described below can be controlled by program code on a non-volatile storage medium NV2 (e.g., a CD, DVD, floppy disk, or hard drive) that interfaces with control terminal T2 (either locally or across a network). Note that non-volatile storage medium NV2 is not shown in FIGS. 2B-2F for clarity.

Communications among router R2, mail servers MS21 and MS22, email client CL2, and control terminal T2 can be over any type of local area network (LAN) or wide area network (WAN). For example, in one embodiment, email client CL2 may connect to mail server MS21 via the Internet (i.e., a WAN), while control terminal T2 may connect to mail server MS21 via a LAN.

In FIG. 2A, source mailbox MB2 is active, and router R2 routes incoming email messages MAIL to source mailbox MB2 while email client CL2 provides user access to source mailbox MB2. Note that router R2 and email client CL2 can be directed to mailbox MB2 according to an address provided by an optional address server D2 (indicated by the dotted lines). Address server can comprise any type of system for providing network addressing information, such as a LDAP (Lightweight Directory Access Protocol) server. As is known in the art, address server D2 can reside either locally (e.g., at router R2 or client CL2) or remotely (e.g., at a network server or at an internet gateway).

To migrate the messages in source mailbox MB2 to a destination mail server MS22, a control terminal T2 sends a create signal CREATE that creates a destination mailbox MB2' on destination mail server MS22. Note that destination mailbox MB2' could be a pre-existing mailbox on destination mail server MS22, in which case command CREATE from terminal T3 would not be required. Note that command CREATE and all other commands discussed herein with respect to FIGS. 2A-2F, 3A-3F, 4, and 5 can comprise any one or more commands for performing the described operation.

Both mailboxes MB2 and MB2' are configured to provide information about the persistence of message identifiers for the messages in those mailboxes. If the message IDs are persistent, then each message ID will always refer to the same message. This persistence information is typically provided either by supplying persistent message IDs (i.e., message identifiers that do not change from session to session) or by providing persistence indicators that can be used to determine whether or not the message IDs for the messages in a mailbox have changed. Most modern email systems provide at least one of the two options.

For example, both POP mail systems (Post Office Protocol, see IETF (Internet Engineering Task Force) RFC (Request for Comments) 1939 (May 1996)) and IMAP mail systems (Internet Message Access Protocol, see IETF RFC 3501 (March 2003)) generally assign unique and permanent message IDs to each message. However, a mailbox in an IMAP system is also assigned a UIDVALIDITY value that changes if the message ID association within that mailbox changes.

Figure 2B:
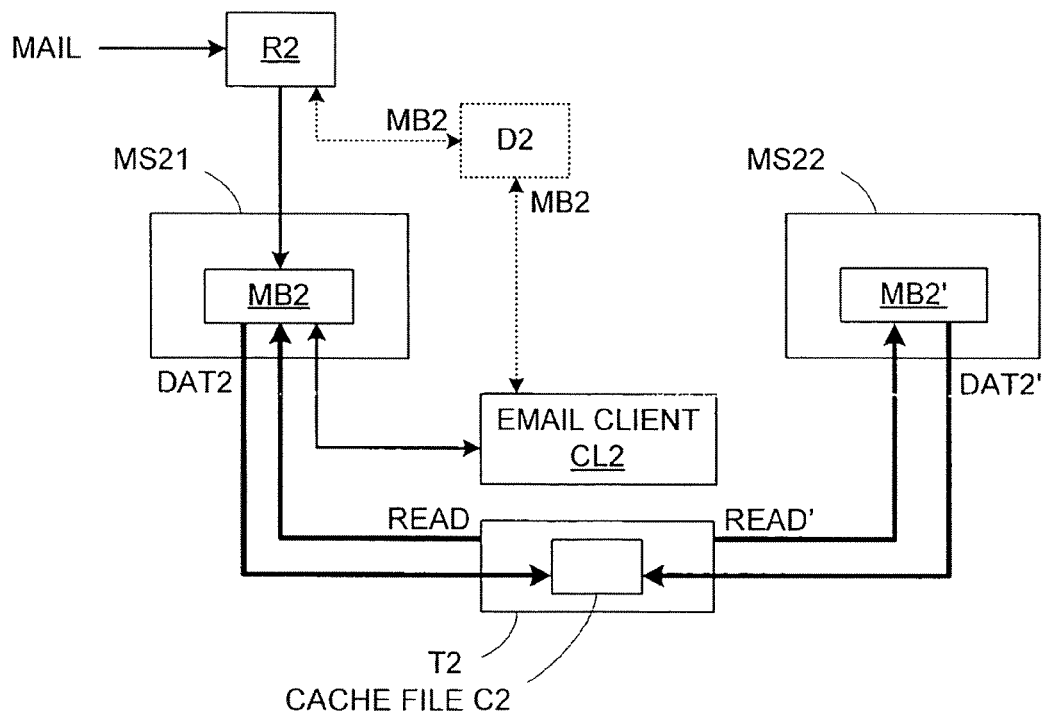

In any case, to perform a mailbox migration, state data from mailboxes MB2 and MB2' are stored in a migration cache file C2, as shown in FIG. 2B. The state data include message IDs for the messages in mailboxes MB2 and MB2' that can be compiled into a message ID map that maps the messages IDs of the source messages to the message IDs of the corresponding destination messages. In other embodiments, the state data can also include persistence indicators (indicating whether or not message IDs have changed) and state indicators (such as flags indicating whether a message has been read (\Seen), replied to (\Answered), deleted (\Deleted), or otherwise manipulated by a user). Note that while migration cache file C2 is depicted as being stored within control terminal T2 for exemplary purposes, according to various other embodiments, migration cache file C2 can be stored at any location accessible by both mail servers MS21 and MS22.

In one embodiment, generation of migration cache file C2 can begin with an initial command READ applied to mailbox MB2 to extract state data DAT, and a command READ' optionally applied to mailbox MB2' to extract state data DAT'. For example, if mail servers MS21 is an IMAP server, command READ could comprise an IMAP SELECT command, which would return a persistence indicator in the form of a UIDVALIDITY value from mailbox MB2. As noted above, the UIDVALIDITY value is associated with all the messages in a mailbox and only changes when the message IDs (UIDs, or Unique IDs) of those messages have been reassigned. By storing the UIDVALIDITY value for mailbox MB2 in migration cache file C2, a subsequent SELECT command can be applied to mailbox MB2 and the returned UIDVALIDITY value can be compared to the stored UIDVALIDITY value to determine whether any message ID changes have taken place.

Figure 4:
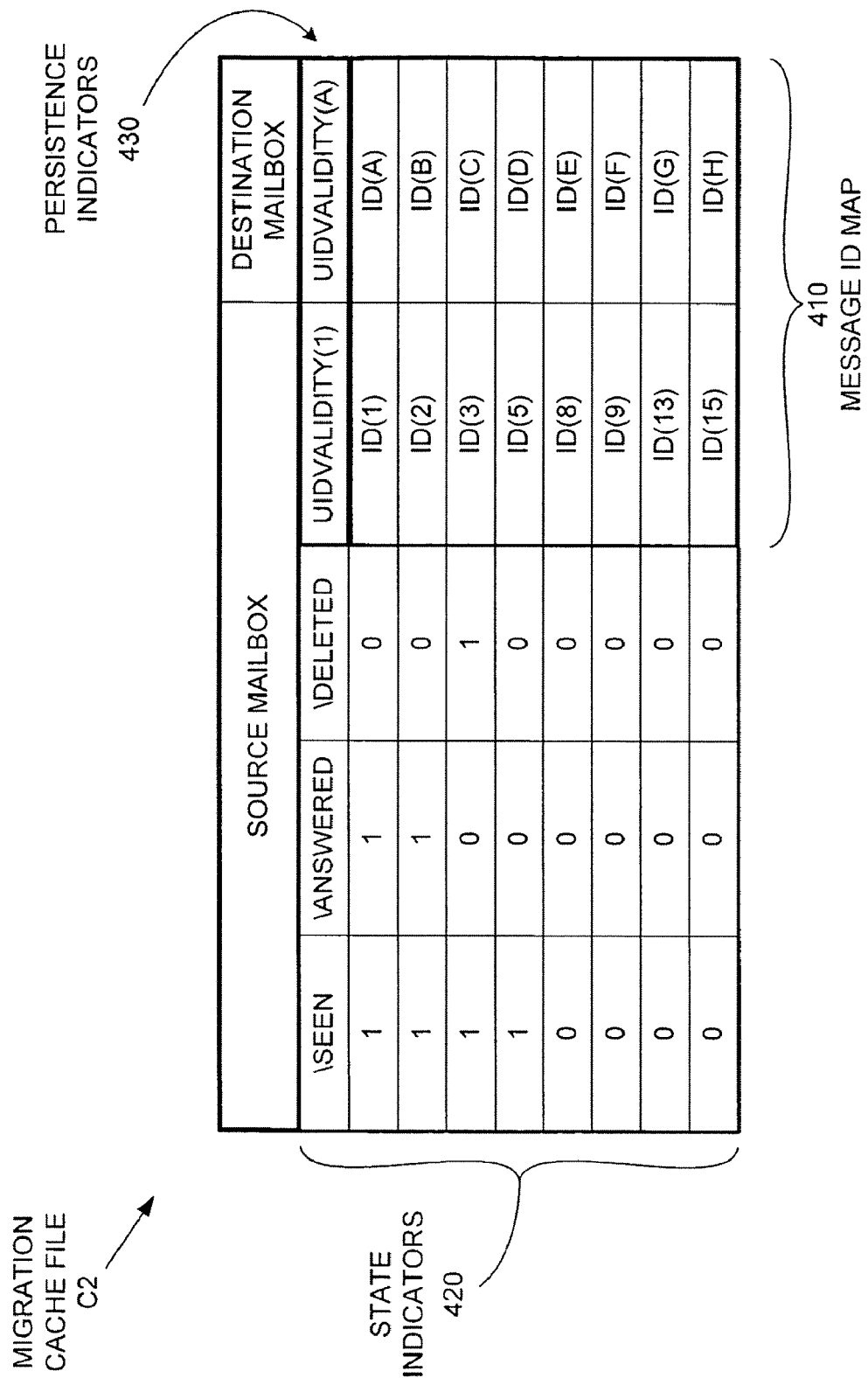
FIG. 4 is a schematic diagram of a migration cache file for use in a low-downtime, low-impact mailbox migration process.

FIG. 4 shows an exemplary detailed view of migration cache file C2 that includes a message ID map 410, stored state indicators 420, and stored persistence indicators 430. Message ID map 410 includes source mailbox message IDs ID(1), ID(2), ID(3), ID(5), ID(8), ID(9), ID(13), and ID(15), which are associated with destination mailbox message IDs ID(A), ID(B), ID(C), ID(D), ID(E), ID(F), ID(G), and ID(H), respectively.

Meanwhile, state indicators 420 provide flag values for the source messages associated with message IDs ID(1), ID(2), ID(3), ID(5), ID(8), ID(9), ID(13), and ID(15). For example, the source messages associated with IDs ID(1) and ID(2) have both been seen (i.e., flag \Seen is true) and answered (i.e., flag \Answered is true). The source message associated with ID(3) has been seen and deleted (i.e., flags \Seen and \Deleted are both true), while the source message associated with ID(4) has only been seen (i.e., only flag \Seen is true). None of the other source messages have been read. Note that while three flags are depicted for exemplary purposes, an IMAP system (or any other system that incorporates flags) can include any number of flags.

Finally, persistence indicators 430 include a UIDVALIDITY(1) value for the messages in the source mailbox and a UIDVALIDITY(A) value for the messages in the destination mailbox. As described above, subsequent comparisons of UIDVALIDITY(1) and UIDVALIDITY(A) to the UIDVALIDITY values of the source and destination mailboxes, respectively, will indicate whether the message IDs in message ID map 410 are valid. In this manner, migration cache file C2 captures and organizes the state data of source mailbox MB2 and destination mailbox MB2', as each source message is mapped to its corresponding drain message (and vice versa) and associated message state data.

Note that only message state indicators (flags) from source messages are stored in migration cache file C2, since only a one-way harmonization from source mailbox MB21 to destination mailbox MB22 is performed during a mailbox migration. Specifically, since it is only destination mailbox MB22 that is updated based on source mailbox MB21 (source mailbox MB21 is not updated with respect to destination mailbox MB22), message state indicators from destination mailbox MB22 need not be stored for later comparisons with message state indicators from source messages.

Figure 2C:
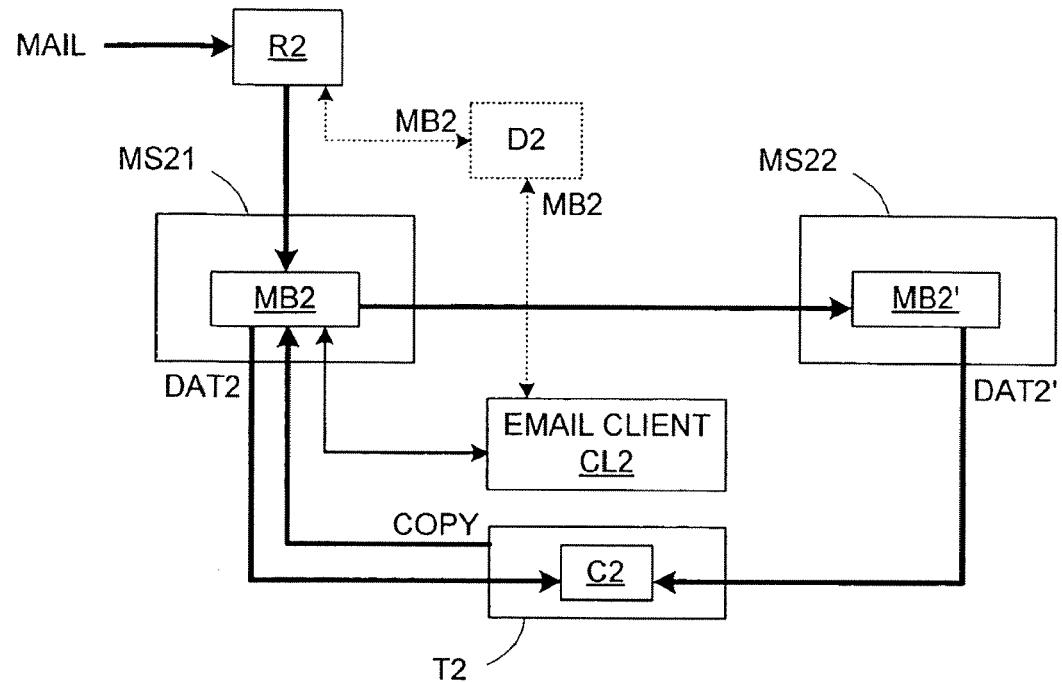

Returning to FIG. 2B, note that migration cache file C2 (such as shown in FIG. 4) will typically not be fully completed (populated with values) until after subsequent message copy operations, since destination-side message IDs and state data will not be available until those copy operations. Thus, after this initial mailbox data collection, a precopy operation is performed to copy messages from mailbox MB2 to MB2', as shown in FIG. 2C. Specifically, terminal T2 provides a copy command COPY to source mailbox MB2 (and to destination mailbox MB2' if necessary) to copy the messages in mailbox MB2 over to mailbox MB2'.

A source-to-destination message ID map in migration cache file C2 can be created during this copy operation by associating the source message ID (in mailbox MB2) with the destination message ID (in mailbox MB2') for each copied message. In another embodiment, any flags (message status indicators for message characteristics such as read/unread, answered/unanswered, and deleted/not deleted, among others) associated with the source messages can be copied to migration cache file C2 at this point (as part of data DAT2 and/or DAT2').

The creation of the message ID map in migration cache file C2 can be greatly simplified if source mail server MS22 is an IMAP server that includes the UIDPLUS extension (described in IETF RFC 2359 (June 1998)), an APPEND command (used to copy messages from one mail server to another) will return an APPENDUID response code that includes the UID(s) assigned to the message(s) copied into mailbox MB2'. These UID(s) can then be stored in the message ID map in migration cache file C2.

Note that during the precopy operation shown in FIG. 2C, email client CL2 can still access source mailbox MB2. Therefore, even if the actual copying of messages is very time-consuming, a user at email client CL2 will experience no email access downtime. However, this also means that until email client CL2 and router R2 are switched over to access destination mailbox MB2', changes can be made to source mailbox MB2 that do not appear in destination mailbox MB2'.

Figure 2D:
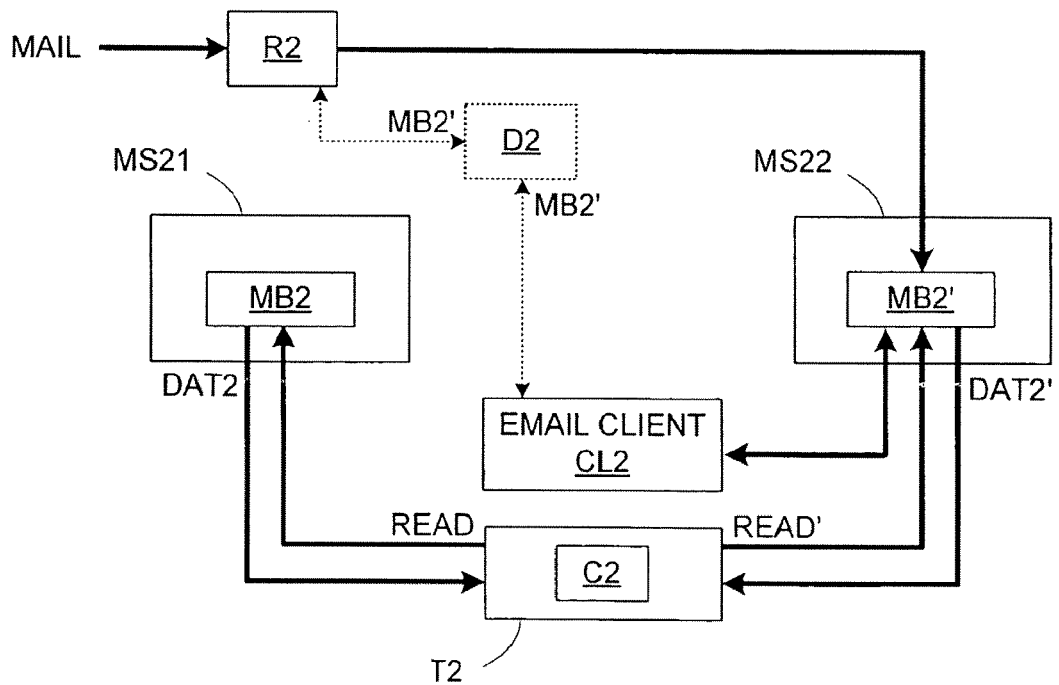

Therefore, as shown in FIG. 2D, a final resolving operation to bring destination mailbox MB2' to an updated state first involves changing the address stored in address server D2 for mailbox MB2 to the address for mailbox MB2', thereby rendering source mailbox MB2 inactive by preventing any further email messages MAIL from being delivered to mailbox MB2 by router R2, and preventing any further manipulation of messages within mailbox MB2 by client CL2. At the same time, the directory change makes destination mailbox MB2' active by addressing router R2 and email client CL2 to mailbox MB2'. In this manner, email traffic for source mailbox MB2 is redirected to destination mailbox MB2'.

Note that depending on the requirements of the particular email and system protocols being used, a forced reconnection may be required to cause email client CL2 to switch over to destination mailbox MB2'. Note that the address change applied to director D2 can be performed via control terminal T2 or by a separate directory configuration interface (not shown for clarity).

At this point, READ and READ' commands can be sent to source mailbox MB2 and/or destination mailbox MB2', respectively, to extract message state data DAT and DAT' from mailboxes MB2 and MB2', respectively. Message state data DAT from source mailbox MB2 can include any of persistence indicators, new message IDs, and status flags, while message state data DAT' from destination mailbox MB2' can include any of persistence indicators and status flags. The particular information contained in message state data DAT and DAT' will depend on the characteristics of mail servers MS21 and MS22.

Figure 2E:
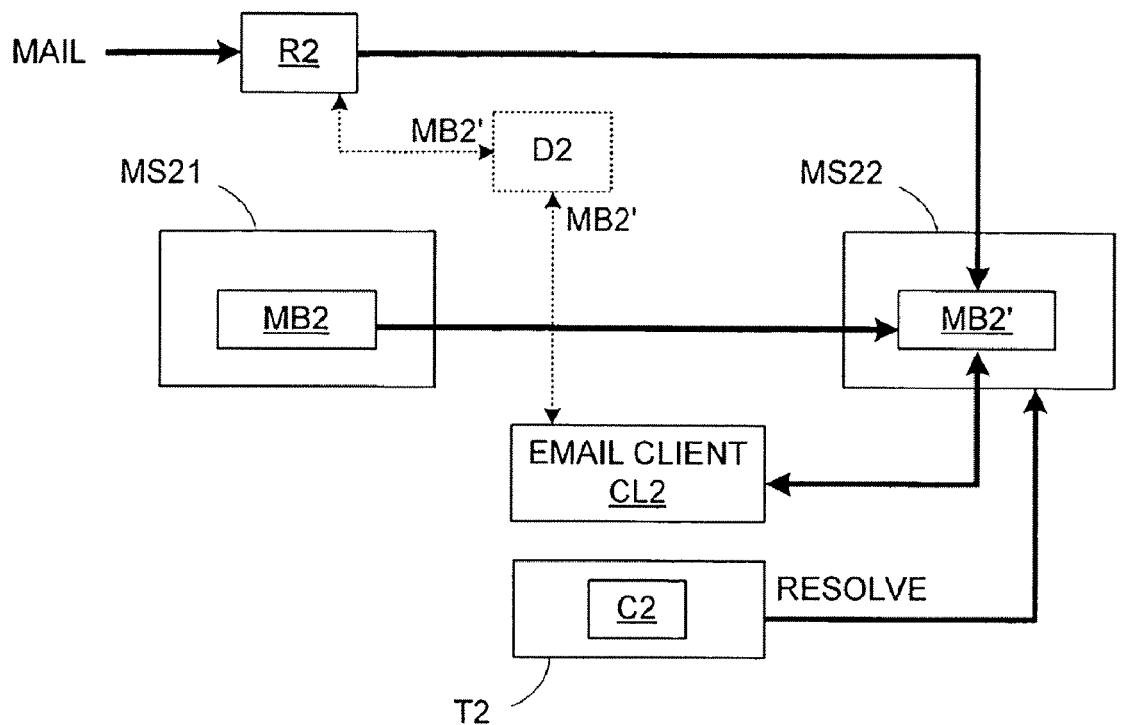
Figure 2F:
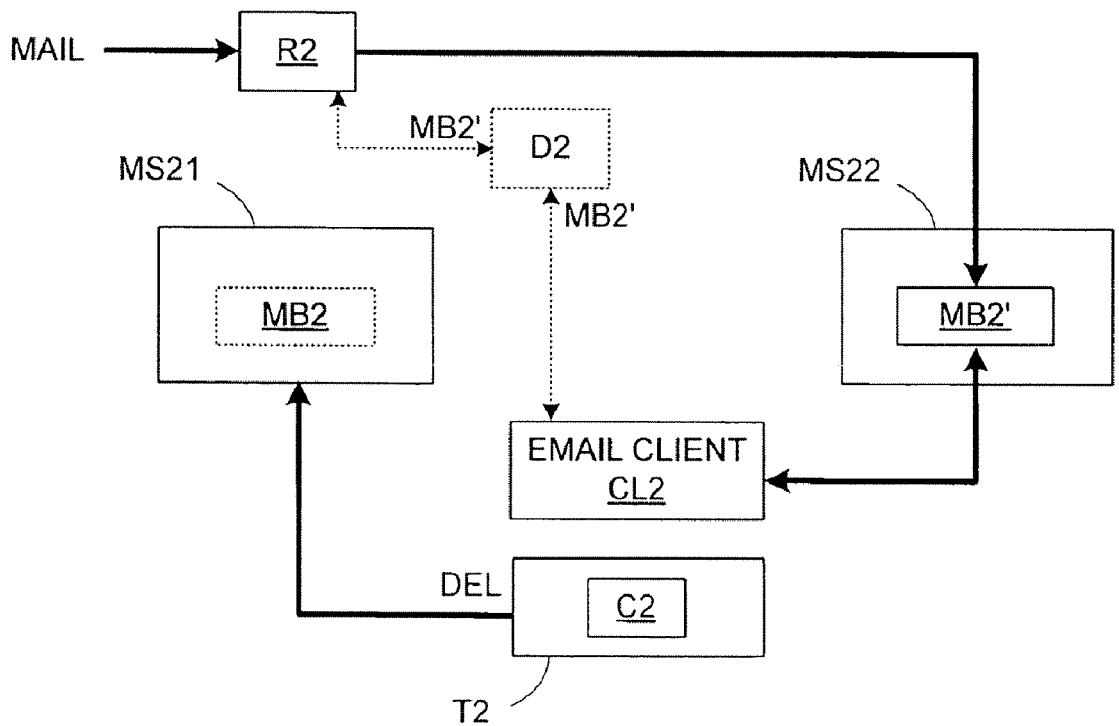

Then, as shown in FIG. 2E, control terminal T2 can issue a command RESOLVE to cause destination mailbox MB2' to be resolved to an updated state based on the message ID map stored in migration cache file C2 and any additional message data gathered by the READ and READ' commands in FIG. 2D (described in greater detail below). In an optional final step, control terminal T2 can then issue a command DELETE to source mail server MS21 to delete source mailbox MB2, as shown in FIG. 2F. Note that the resolving operation shown in FIG. 2E can be performed very quickly (e.g., less than a second for mailboxes having thousands of messages), due to the fact that the bulk of the time-consuming message copying has already been performed (in FIG. 2C). Therefore, a user at email client CL2 will typically experience zero downtime (or very low downtime) during the mailbox migration.

As noted above, the particular final resolution options performed to update destination mailbox MB2' to the most current state depend on the characteristics of mail servers MS21 and MS22, and also on the states of mailboxes MB2 and MB2' determined in FIG. 2D.

For example, if mail server MS21 is a POP server with persistent message IDs, message data DAT could simply include a listing of the UIDs in mailbox MB2. This UID listing could then be compared to the message ID map stored in migration cache file C2. Then, as shown in FIG. 2E, messages corresponding to UIDs not present in the message ID map could then be copied over to destination mailbox MB2', while messages in destination mailbox MB2' corresponding to UIDs present in the message ID map but not present in the UID listing could be deleted from mailbox MB2', all in response to a command RESOLVE from control terminal T2. In this manner, destination mailbox MB2' can be updated to the most current possible state.

Alternatively, if both mail servers MS21 and MS22 are IMAP servers, the updating of destination mailbox MB2' is more complicated, due to the fact that persistence is not guaranteed for the message IDs (UIDs). The values returned from mailboxes MB2 and MB2' (e.g., UIVALIDITY, UID listings, message flags) in response to commands READ and READ', respectively, determine which of a range of operations to perform during the resolving operation shown in FIG. 2E.

For example, if the UIDVALIDITY values read from mailboxes MB2 and MB2' both match the stored UIDVALIDITY values stored in migration cache file C2, the message ID map stored in migration cache file C2 contains valid UIDs, and can therefore be used to manage the updating of destination mailbox MB2'. All new source messages (i.e., messages having a UID in mailbox MB2 that is not represented in the message ID map in migration cache file C2) are copied to mailbox MB2', while all deleted source messages (i.e., messages in mailbox MB2, associated with UIDs in the message ID map that do not exist in mailbox MB2) are deleted from mailbox MB2'. Then, to complete the updating of destination mailbox MB2', any message flags read from source mailbox MB2 that do not match the source message flags previously stored in migration cache file C2 are copied to the corresponding messages in destination mailbox MB2', unless the destination messages flags themselves do not match the message flags stored in file cache C2 (which would indicate that some activity had already been performed on the message(s) in mailbox MB2' by client CL2).

On the other hand, matching source UIDVALIDITY values (i.e., the UIDVALIDITY read from mailbox MB2 matches the stored source UIDVALIDITY value) and non-matching destination UIDVALIDITY values (i.e., the UIDVALIDITY value read from mailbox MB2' does not match the stored destination UIDVALIDITY value) means that some change has occurred at destination mailbox MB2' (presumably in response to client CL2), and therefore no updates to messages associated with UIDs in the message ID map in migration cache file C2 should be made. However, any new messages in source mailbox MB2 (i.e., messages having UIDs not represented in the stored message ID map in migration cache file C2) need to be copied to destination mailbox MB2' to complete the updating process.

Yet another response is required with non-matching source UIDVALIDITY values and matching destination UIDVALIDITY values. In such a situation, the destination UIDs are still valid, but some change has been applied to source mailbox MB2 to render the source UIDs stored in migration cache file C2 invalid. Therefore, the messages in mailbox MB2' that were copied over from mailbox MB2 during the precopy operation (FIG. 2C) and any intermediate updating operations must be removed, so that the current messages in source mailbox MB2 can be copied into destination mailbox MB2'.

In one embodiment, the removal and recopy operation can be performed by deleting the messages in mailbox MB2' associated with UIDs in the message ID map in migration cache file C2, and then doing a full copy of all the messages (and associated flags) in mailbox MB2 into mailbox MB2'. Note that any messages that have been added to mailbox MB2' via router R2 are not deleted, so that the final (updated) mailbox MB2' includes all of the current messages from source mailbox MB2 plus any messages received once router R2 was switched over to mailbox MB2'.

Finally, if both mailboxes MB2 and MB2' provide non-matching UIDVALIDITY values, then the mailbox migration is in a somewhat indeterminate state, and various methods can be used to recover. For example, in one embodiment, the stored UIDVALIDITY values in migration cache file C2 for both mailboxes MB2 and MB2' can be updated to match the newly read values, and a full recopy of all the messages from mailbox MB2 to mailbox MB2' can be performed.

In another embodiment, the MD5 checksums for the messages in source mailbox MB2 can be compared with MD5 checksums for the messages in destination mailbox MB2'. A message in destination mailbox MB2' having an MD5 checksum value that matches the MD5 checksum value of a message in source mailbox MB2 is replaced with that corresponding source message. This comparison process can be further enhanced via the use of message date checking (e.g., via the INTERNALDATE data item in an IMAP system, which returns the date the message was received). If duplicate messages exist in either mailbox having the same MD5 values (e.g., messages accidentally copied by the user back into the mailbox), the INTERNALDATE value can be used to differentiate the two messages. In this manner, any messages originally copied from mailbox MB2 to mailbox MB2' are updated, while messages directly routed to mailbox MB2' are left unchanged. Note that while the use of MD5 checksum comparisons provides a relatively thorough means of comparing source and destination messages, such a method can also be very time consuming, since all of the messages (or at least the message headers) must be downloaded.

FIG. 3 shows a flow diagram of a mailbox migration process. In an optional "CREATE DESTINATION MAILBOX" step 310, a destination mailbox (e.g., mailbox MB2') can be created on a destination server (e.g., mail server MS22). Note that if the destination mailbox already exists, step 310 is unnecessary.

Then, in a "CREATE MIGRATION CACHE" step 320, a cache file (e.g., migration cache file C2) can be created that stores a message ID map that correlates messages in the source mailbox (MB2) with messages in the destination mailbox (MB2'). In other embodiments, the cache file can also store status indicators (e.g., message flags) and persistence indicators (e.g., UIDVALIDITY) for the source and/or destination mailboxes.

Note that as described above with respect to FIGS. 2B and 2C, the migration cache file can be created in part or in whole during a "PRECOPY MESSAGES" step 330, during which messages in the source mailbox are copied over to the destination mailbox. As each message is copied (e.g., steps 332, 333, 335 and 336), the original (source) message ID and the resulting (destination) message ID are stored in the message ID map in the cache file. In one embodiment, message flags can also be stored in the cache file (e.g., steps 331 and 334).

Figure 3A:
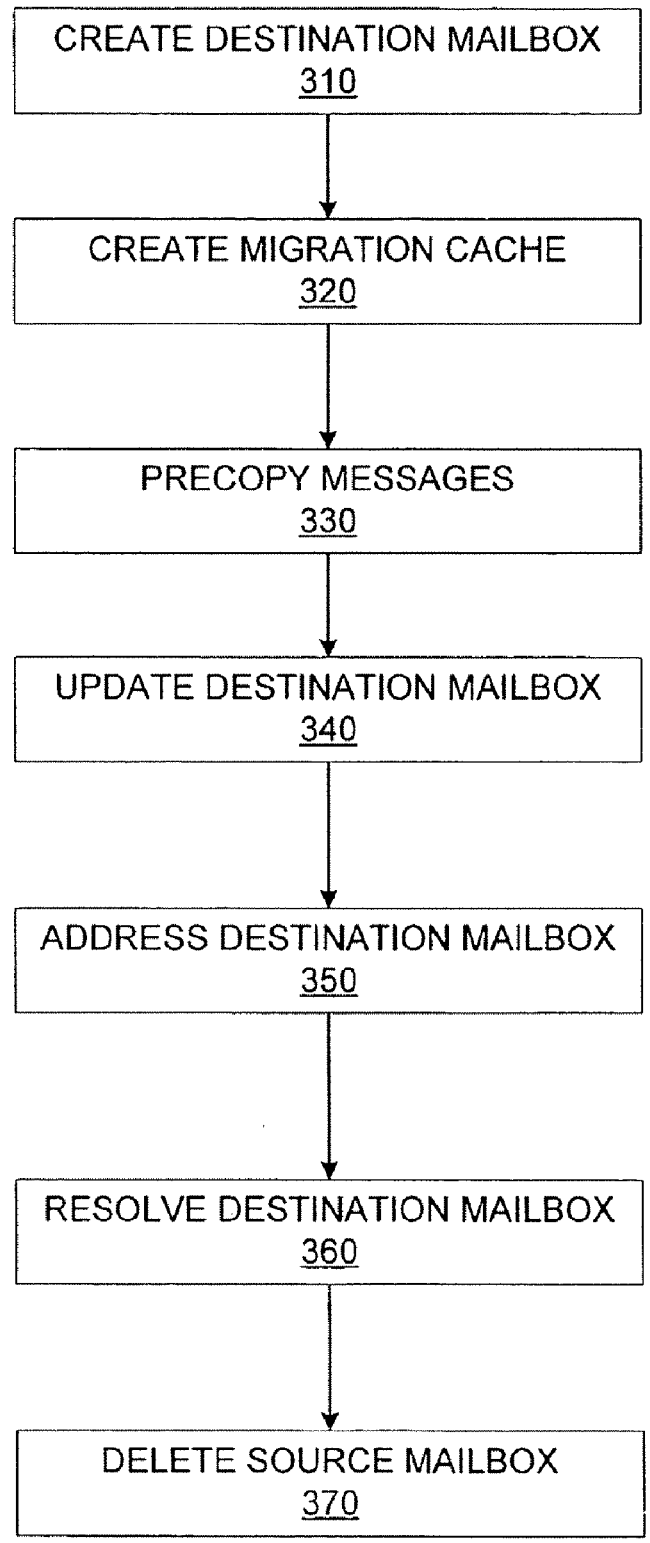
FIGS. 3A, 3B, 3C, 3D, 3E, and 3F are flow diagrams of a low-downtime, low-impact mailbox migration process.
Figure 3B:
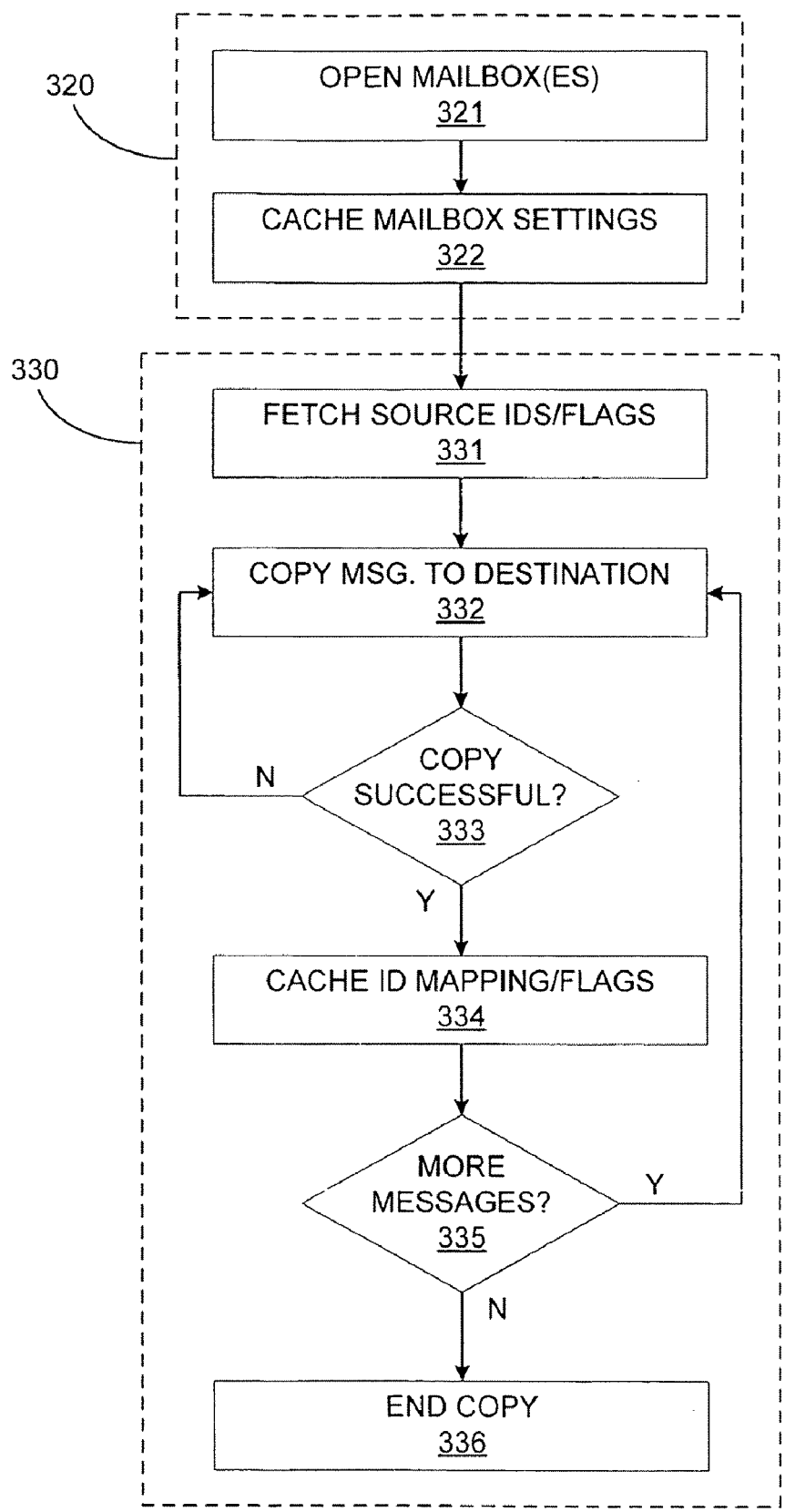

For example, FIG. 3B depicts a detailed flow diagram of exemplary operations performed in steps 320 and 330. In FIG. 3B, step 320 includes an "OPEN MAILBOX(ES)" step 321 followed by a "CACHE MAILBOX SETTINGS" step 322. The particular mailbox settings stored in the cache file (i.e., cached) can depend on the email protocols being used at the source and destination mail servers. For example, as described with respect to FIG. 2B, for IMAP-based mail servers, step 321 could return UIDVALIDITY values for the source and destination mailboxes, which could then be stored in the file cache in step 322. Alternatively, for POP systems having persistent message IDs, step 321 and 322 could be skipped altogether (since the POP protocol does not provide for any persistence indicators).

Returning to FIG. 3A, an optional "UPDATE DESTINATION MAILBOX" step 340 can be performed one or more times after step 330 to keep the destination mailbox as similar as possible to the source mailbox. In step 340, the messages in the source mailbox can be compared to the record of the originally copied messages stored in the migration file cache (e.g., stored UIDVALIDITY, UIDS, and flag values can be compared to the actual UIDVALIDITY value of the source mailbox and the actual UID and flag values of the messages in the source mailbox, and any new or changed messages can be copied over to the destination mailbox).

Because the bulk of the message copying is performed prior to step 340 in step 330, the subsequent intermediate updating operation of optional step 340 can be rapidly performed. At the same time, the intermediate updating operation provided in step 340 can beneficially reduce the time required for the final updating operation (step 360, described in greater detail below) by incorporating most of the changes applied to the source mailbox between the time step 330 is performed and the start of step 360.

To begin the final switchover from the source server (MS21) to the destination server (MS22), the directory (D2) address for the source mailbox is changed to the address for destination mailbox in an "ADDRESS DESTINATION MAILBOX" step 350. Subsequently, incoming mail is routed to the destination mailbox and an email client attempting to access the source mailbox is directed to the destination mailbox.

Then, in a "RESOLVE DESTINATION MAILBOX" step 360, the destination mailbox is brought up to date using the previously stored message ID map and any stored mailbox data. The source mailbox can then be deleted from the source mail server in an optional "DELETE SOURCE MAILBOX" step 370 (as shown in FIG. 2F) to complete the migration process.

Figure 3C:
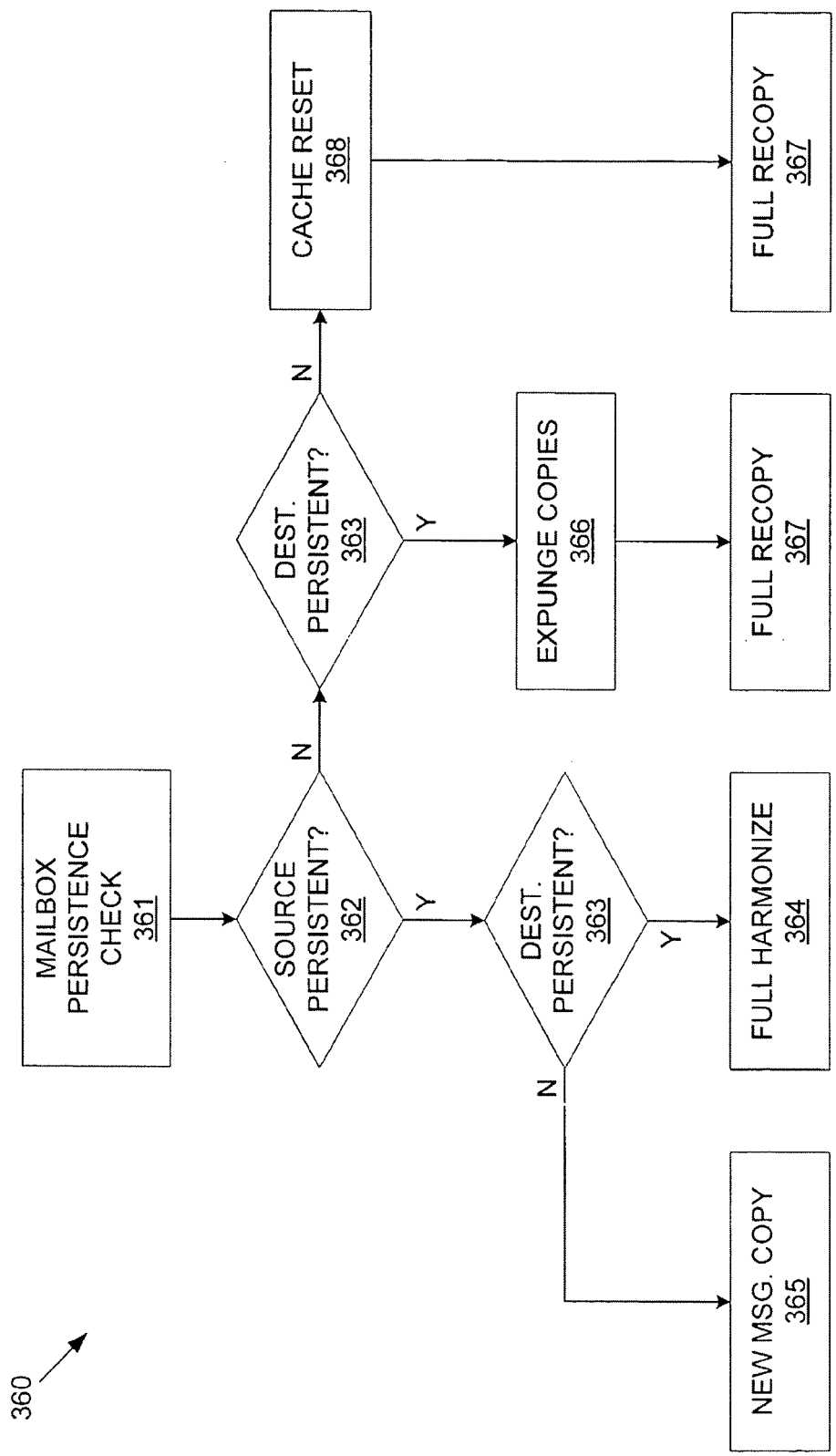

As noted above with respect to FIG. 2E, the specific operations performed during step 360 depends on the contents of the migration cache file and the states of the source and destination mailboxes. For example, FIG. 3C shows an exemplary detailed flow diagram of the operations performed in step 360, as described in greater detail below with respect to FIGS. 3C-3F.

In a "MAILBOX PERSISTENCE CHECK" step 361, the persistence of the message IDs in both the source and destination mailboxes is evaluated. The nature of this evaluation depends on the particular protocol used by the source and destination mail servers. For example, a POP mail server providing persistent message IDs will inherently have persistent message IDs. Alternatively, an IMAP mail server indicates message ID persistence by maintaining a constant UIDVALIDITY value. Thus, evaluating the persistence of an IMAP mailbox can involve comparing a stored UIDVALIDITY value in the migration cache file against a UIDVALIDITY value extracted from the mailbox itself, as described above with respect to FIG. 2D.

Figure 3D:
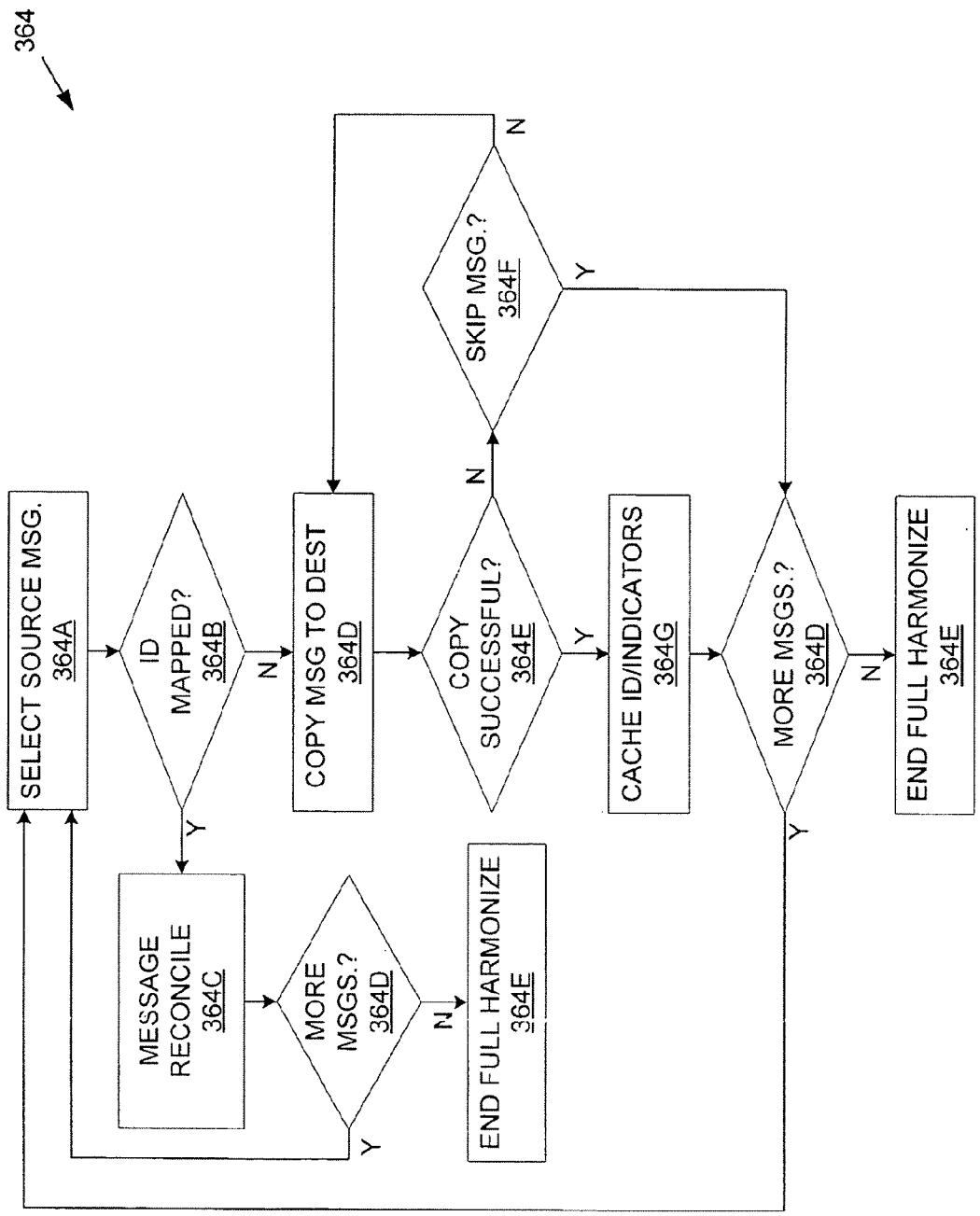

If message ID persistence is found for both the source and destination mailboxes, a "SOURCE PERSISTENT?" decision block 362 and a "DESTINATION PERSISTENT?" decision block 363 lead to a "FULL HARMONIZE" step 364, in which the destination mailbox is harmonized with the source mailbox (i.e., updated to reflect the most recent changes to the source mailbox, except for changes at the source mailbox superceded by changes at the destination mailbox). Note that this is a one-way (unidirectional) harmonization; i.e., only the destination mailbox is updated. FIG. 3D shows an exemplary detailed flow diagram of the operations performed in step 364.

In a "SELECT SOURCE MESSAGE" step 364A, a first one of the messages in the source mailbox is selected. In an "ID MAPPED?" decision block 364B, the ID of the message is compared to the stored message ID map in the cache file. If the ID is not present in the message ID map, the message is copied to the destination mailbox in a "COPY MSG TO DESTINATION" step 364D. For example, for IMAP systems, an APPEND command could be issued to perform this copying operation.

In a "COPY SUCCESSFUL?" decision block 364E, a determination is made as to whether the message was properly copied (e.g., via returned error or completion codes). Note that the decision made in decision block 364E can be manually entered by a user, or can be based on predefined automated logic (e.g., retry step 364D three times before skipping the message).

If the copy operation of step 364D fails, a "SKIP MESSAGE?" decision block 364F either loops the process back to step 364D to re-attempt the copy operation, or skips copying the message entirely and proceeds to a "MORE MESSAGES?" decision block 364D that either loops the process back to step 354A to select a new message from the source mailbox (if available) or ends the full harmonization process at a "END FULL HARMONIZE" step 364E.

However, if the copy operation succeeds, the source (original) message ID is saved and associated with the destination (copied) message ID in the message ID map in the migration cache file in a "CACHE ID/INDICATORS" step 364G. For IMAP systems implemented with the UIDPLUS extension, the destination UID is returned in response to the copy operation of step 364D, further simplifying the performance of step 364G. At the same time, message state indicators (flags), if available, can also be saved in the cache file in step 364G. Note that for IMAP systems, a FETCH FAST command can be used to efficiently collect the message flags and other desired message state data, even if all flags are not used. In one embodiment, the FETCH FAST command (or equivalent command(s)) could be applied during decision block 364B to extract flags and any other desired message data at the same time the UID of the message is obtained, thereby reducing the time required for subsequent steps (such as 364G) that use any of the message data.

The operation then proceeds to decision block 364D to determine whether to select the next message or end the full harmonization operation. In this manner, any new messages in the source mailbox that were not previously copied into the destination mailbox are added to the destination mailbox.

However, a message ID match in step 364B indicates that the message was previously copied to the destination mailbox. In that case, only the state information related to that message is copied to the destination mailbox in a "MESSAGE RECONCILE" step 364C, after which decision block 364D either loops the process back to step 364A to select a new message from the source mailbox (if present) or completes the full harmonization process at step 364E.

Figure 3E:
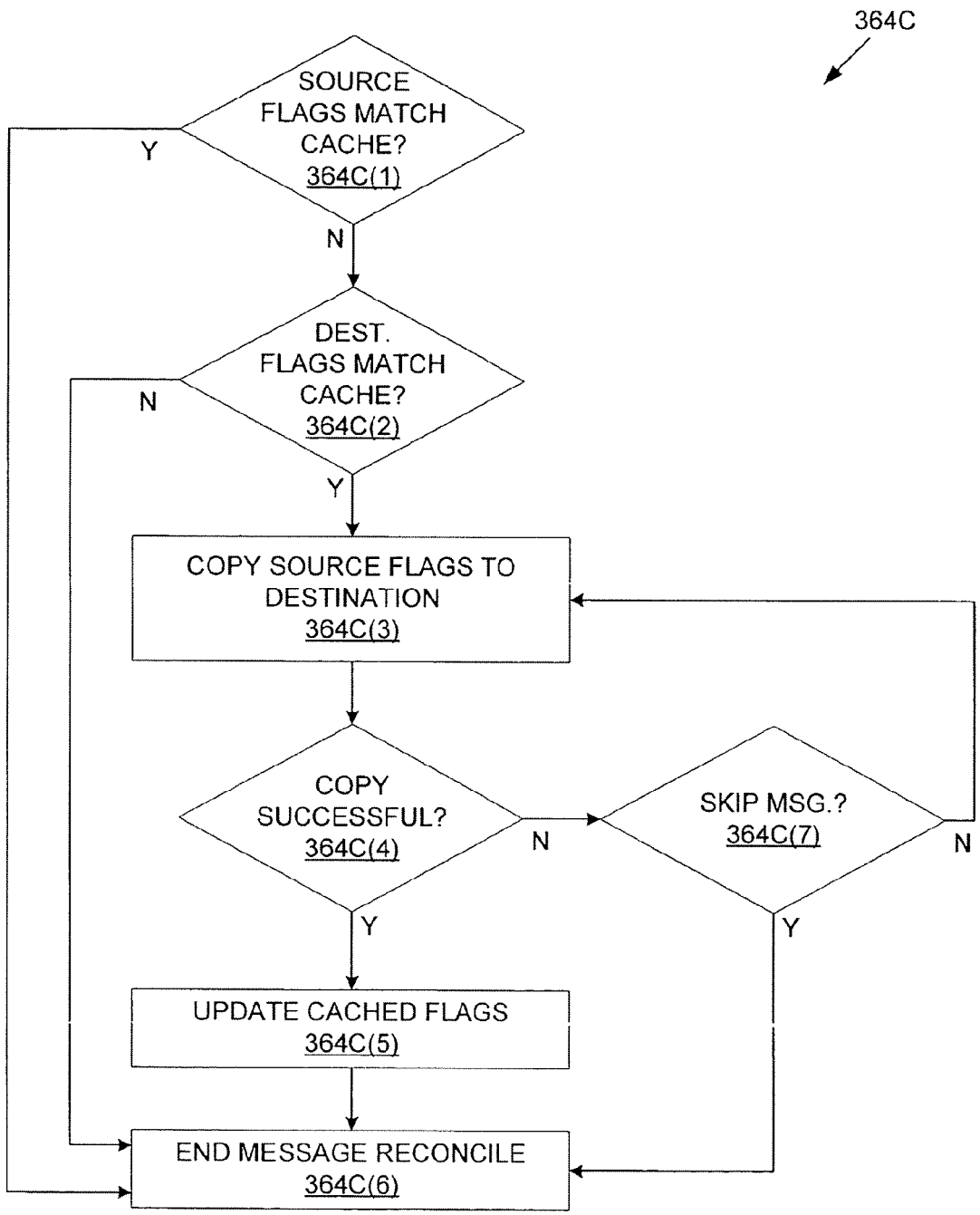

FIG. 3E shows an exemplary detailed flow diagram of message reconciliation step 364C, in which a destination message is updated to reflect the most recent changes to the corresponding source message, except for source message changes superceded by changes to the destination message. Initially, the stored flags in the migration file cache (e.g., stored during the original copying of the message in step 334 in FIG. 3B) are compared to the current flags for the source message in a "SOURCE FLAGS MATCH CACHE?" decision block 364C(1). A match indicates that no change has been made to the source message flags since the original copy operation, and therefore the process loops to an "END MESSAGE RECONCILE" step 364C(6), since no modification at the destination mailbox is required.

A non-match at decision block 364C(1) indicates that the source message has undergone some state change (e.g., has been read, answered, or deleted), and the process continues to a "DESTINATION FLAGS MATCH CACHE?" step 263C(2), in which the current flags of the corresponding destination message are compared to the stored flags in the cache file. A non-match at step 364C(2) indicates that some operation has been performed on the destination message in the destination mailbox. Therefore, since the operation on the destination message necessarily occurred after any operation on the original message in the source mailbox, the destination message states (flag settings) are retained, and the process loops to step 364C(6) to end the process.

A match at step 364C(2) indicates that the destination message is still in the same state that it was during the original copy from the source mailbox. Therefore, to update that destination to the most current state, the flags from the source message are copied over to the destination message in a "COPY SOURCE FLAGS TO DESTINATION" step 364C(3). In a "COPY SUCCESSFUL?" decision block 364C(4), a determination is made as to whether the flags were properly copied. If so, the stored flags in the migration cache file are updated to reflect the new source message flags in an "UPDATE CACHED FLAGS" step 364C(5), after which the process ends at step 364C(6). Note that for IMAP systems, a FETCH FLAGS command can be used to efficiently collect the message flags, even if all flags are not used.

If the flags were not properly copied, the next step is determined in a "SKIP MESSAGE?" decision block 364C(7), which either loops the process back to step 364C(3) to re-attempt the copy operation, or skips the flag transfer by going directly to step 364C(6). Note that the decision made in decision block 364C(7) can be a manual decision entered by a user, or can be based on automated logic (e.g., make three re-attempts to copy before skipping to the end).

Figure 5:
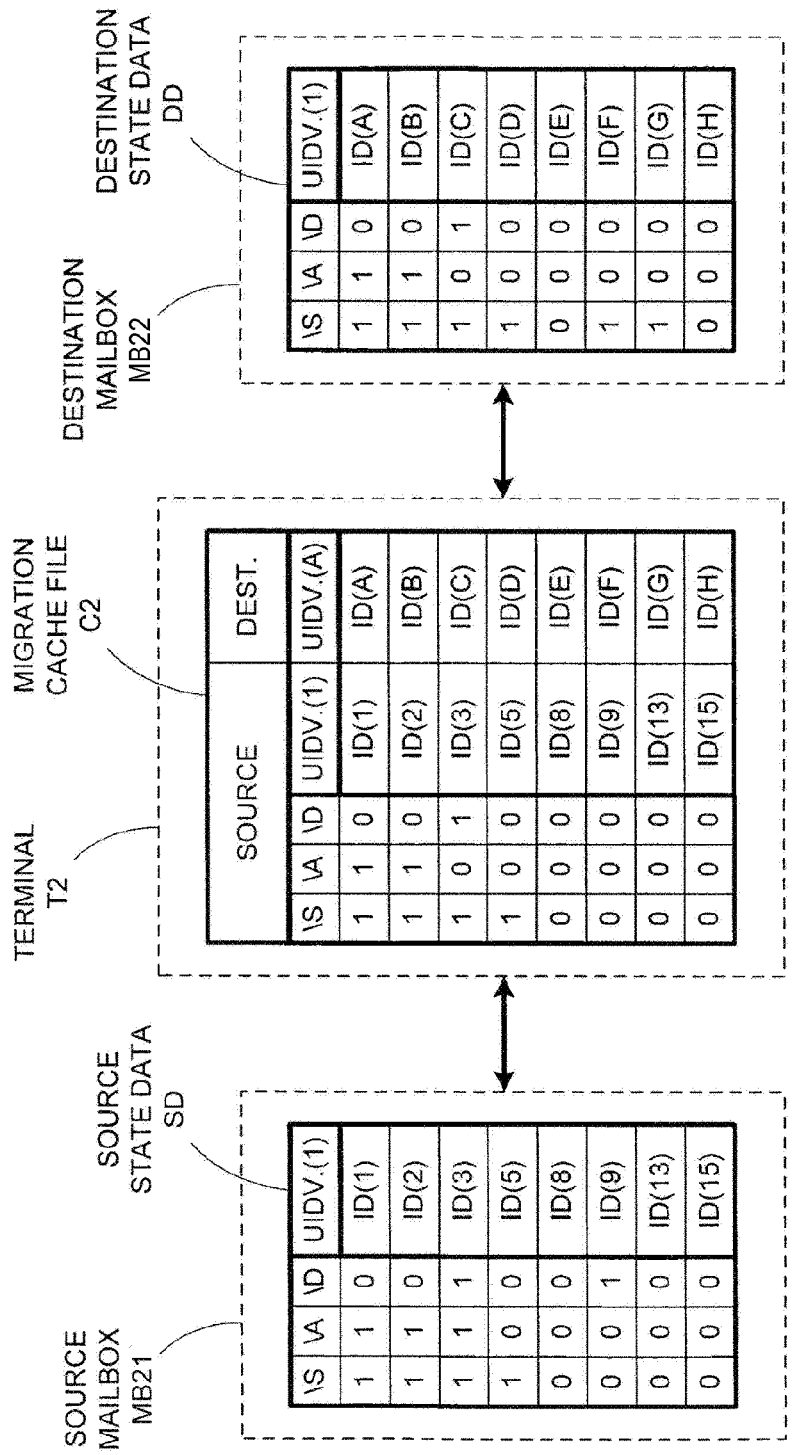
FIG. 5 is a schematic diagram of source and drain mailboxes and a migration cache file for illustrating various low-impact message reconciliation operations.

The message reconciliation process shown in FIG. 3E can also be described with respect to the block diagram of mailboxes MB21 and MB22 and control terminal T2 shown in FIG. 5. In FIG. 5, control terminal includes cache file C2 (which is substantially similar to the cache file C2 shown in FIG. 4), source mailbox MB21 includes source state message data SD, and destination mailbox MB22 includes destination message state data DD.

The UID and flag data stored in migration cache file C2 represents data taken at the time of the precopy (step 330 in FIG. 3A) or most recent intermediate updating (step 340 in FIG. 3A) operation. As noted above, when performing message reconciliation, source and destination UIDVALIDITY values UIDVALIDITY(1) and UIDVALIDITY(A) from source mailbox MB21 and destination mailbox MB22, respectively, must be equal to their stored counterparts in migration cache file C2 to ensure that the source and destination message UIDs are still valid.

As described above with respect to FIG. 3E, the current flag settings of the source messages (source message state data SD) are compared with the stored source flag settings in migration cache file C2 (step 364C(1)). Similarly, the current flag settings for the destination messages (in destination message state data DD) are compared with the stored destination flag settings in migration cache file C2 (step 364C(2)).

If the current source flag settings in source message state data SD match the stored flag settings in migration cache file C2, no change is made to the destination message source flags in destination message state data DD. Therefore, since the source messages having UIDs ID(1), ID(2), ID(5), ID(8), ID(13), and ID(15) are the same in both source message state data SD and in migration cache file C2, no change is made to the destination flag settings for destination messages having UIDs ID(A), ID(B), ID(D), ID(E), ID(G), and ID(H), respectively.

Note that the flag settings for the destination message having UID ID(G) does not match the corresponding stored flag settings in migration cache file C2, which indicates that the change to the destination message having UID ID(G) was made by the user at destination mailbox MB22. Therefore, the flag settings for the destination message having UID ID(G) are the most current settings, and are properly left unchanged during the message reconciliation process.

For similar reasons, if the current destination flag settings in destination message state data DD do not match the stored flag settings in migration cache file C2, no change is made to the destination flag settings, even if changes are detected in the current source flag settings in source message state data SD. For example, no change should be made to the destination flag settings of the destination message having UID ID(F) since those destination flag settings do not match the stored flag settings in migration cache file C2. This is true even though the source flag settings for the corresponding source message (ID(9)) also do not match the stored flag settings in migration cache file C2, since the change to the destination message having UID ID(F) must necessarily have been made later than any change to the corresponding source message having UID ID(9).

Finally, if the destination flag settings in destination message state data DD do match the stored flag settings in migration cache file C2 but the source flag settings in source message state data SD do not match, the source flag settings from source message state data SD are copied over to the corresponding destination message flag settings in destination message state data DD. For example, the source flag settings in source message state data SD for the source message having UID ID(3) do not match the stored flag settings in migration cache file C2, and therefore should be copied to replace the current destination flag settings for the destination message having UID ID(C), which do match the stored flag settings.

Returning to FIG. 3C, if message ID persistence is found for the source mailbox, but not for the destination mailbox, then some change has been applied to the destination mailbox, presumably by a user via the email client. Therefore, decision blocks 362 and 363 lead to a "NEW MESSAGE COPY" step 365, in which only messages in the source mailbox not previously copied to the destination mailbox are copied to update the destination mailbox. No flags for previously copied messages are transferred to the destination mailbox, since the lack of destination message ID persistence indicates that those previously copied messages are in their most current states.

Figure 3F:
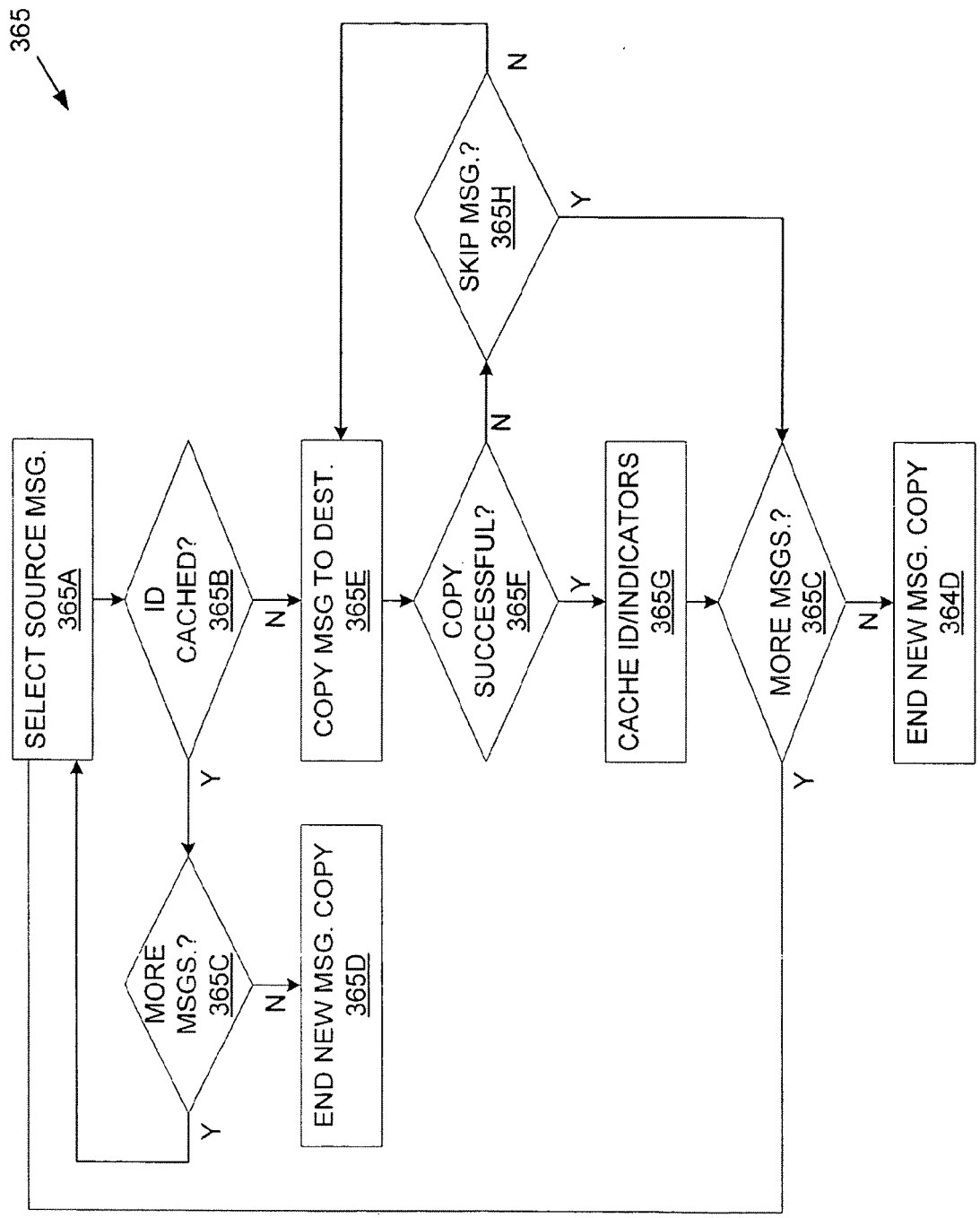

FIG. 3F shows an exemplary detailed flow diagram of the operations performed in step 365. A first message in the source mailbox is selected in a "SELECT SOURCE MESSAGE" step 365A. The message ID of that message is compared with the message ID map stored in the migration cache file in an "ID CACHED?" decision block 365B.

If the message ID is present in the message ID map, the message has been previously copied to the destination mailbox, and the process proceeds to a "MORE MESSAGES?" decision block 365C. If additional messages are present in the source mailbox, decision block 365C loops back to step 365A. Otherwise, operation proceeds to an "END NEW MESSAGE COPY" step 365D to end the process.

If the message ID of the selected source message is not present in the message ID map, that source message has not yet been copied to the destination mailbox, and operation proceeds from decision block 365B to a "COPY MESSAGE TO DESTINATION" step 365E, where the message is copied to the destination mailbox.

In a "COPY SUCCESSFUL?" decision block 365F, a determination is made as to whether the message was properly copied to the destination mailbox. If so, the original (source) message ID is stored and associated with the copied (destination) message ID in the message ID map in the migration cache file in a "CACHE ID/INDICATORS" step 365G. For IMAP systems implemented with the UIDPLUS extension, the destination UID is returned in response to the copy operation of step 365E (e.g., within the APPENDUID response code returned by the APPEND command used to), further simplifying the performance of step 365G. During step 365G, any available flags associated with the source message can also be stored in the migration cache file. Note that for IMAP systems, a FETCH FLAGS command can be used to efficiently collect the message flags, even if all flags are not used. If additional messages are present in the source mailbox, decision block 365C loops the process back to step 365A. Otherwise, operation proceeds to step 365D to end the process.

If the copy operation of step 365E is not successful, the next operation is determined in a "SKIP MESSAGE?" decision block 365H, which either loops the process back to step 365E to re-attempt the copy operation, or skips the message entirely and proceeds to decision block 365C. Note that the decision made in decision block 365H can be a manual decision entered by a user, or can be based on automated logic (e.g., make three re-attempts to copy before skipping the message).

Returning once again to FIG. 3C, if message ID persistence is not found for the source mailbox but is found for the destination mailbox, a change has been made to the source mailbox, and the messages within need to be recopied to the destination mailbox, without deleting or adjusting any messages routed directly to the destination mailbox. Accordingly, decision blocks 362 and 363 lead to an "EXPUNGE COPIES" step 366, in which only messages in the destination mailbox that have been copied from the source mailbox are deleted. In one embodiment, if the destination mailbox is an IMAP mailbox, then this deletion can be accomplished by deleting any UIDs in the destination mailbox that match UIDs stored in the message ID map in the migration cache file, and then applying the EXPUNGE command to the destination mailbox to remove all messages without UIDs. Then, in a "FULL RECOPY" step 367, all the messages in the source mailbox are copied to the destination mailbox in a manner substantially similar to that described with respect to FIG. 3B, thereby updating the destination mailbox.

Finally, if message ID persistence is not found for the source mailbox or the destination mailbox, neither mailbox is in a well-defined state. As noted above with respect to FIG. 2E, a variety of operations can then be performed. One of the most straightforward is to simply empty the destination mailbox (remove all destination messages) and then copy everything from the source mailbox to the destination mailbox. Thus, in one embodiment, under such circumstances, decision blocks 362 and 363 lead to a "CACHE RESET" step 368, in which the message ID map in the migration file cache is cleared of previous data. In addition, any persistence indicators (e.g., UIVALIDITY values) are also replaced with new values taken from the source and/or destination mailboxes. Then, in a "FULL RECOPY" step 367, all the messages in the source mailbox are copied to the destination mailbox in a manner substantially similar to that described with respect to FIG. 3B, thereby updating the destination mailbox.

Although the invention has been described in detail herein with reference to exemplary embodiments, it is understood that the invention is not limited to those precise embodiments. Various modifications and variations will be readily apparent to one of ordinary skill in the art. For example, in FIG. 3C, if the source mailbox is on a POP mail server having persistent message IDs, "SOURCE PERSISTENCE" decision block 362 could be replaced with a direct path between step 361 and decision block 363. Accordingly, it is intended that the scope of the invention be defined by the following claims and their equivalents.

The invention claimed is:

1. A method for migrating messages from a source mailbox on a source mail server to a destination mailbox on a destination server, the method comprising:
    copying a first source message from the source mailbox to the destination mailbox to create a first destination message during a precopy operation, the first source message having a first source message ID and a first set of source message state indicator values, and the first destination message having a first destination message ID and a first set of destination message state indicator values;
    enabling email client access to the source mailbox during the precopy operation to prevent email access downtime during actual copying of messages from the source mailbox to the destination mailbox; and
    creating a migration cache file, wherein creating the migration cache file comprises:
        storing the first source message ID as a first stored source message ID in the migration cache file;
        storing the first destination message ID as a first stored destination message ID in the migration cache file;
        associating the first stored source message ID with the first stored destination message ID in a message ID map in the migration cache file;
        storing the first set of source message state indicator values in the migration cache file as a first set of stored source message state indicator values; and
        associating the first set of stored source message state indicator values with the first stored source message ID in the migration cache file.

2. The method of claim 1, further comprising copying a second source message having from the source mailbox to the destination mailbox to create a second destination message, the second source message having a second source message ID and a second set of source message state indicator values; and the second destination message having a second destination message ID and a second set of destination message state indicator values,
    wherein creating the migration cache file further comprises:
        associating the second source message ID with the second destination message ID in the message ID map; and
        associating the second set of source message state indicator values with the second source message ID in the migration cache file.

3. The method of claim 1, wherein creating the migration cache file further comprises:
    extracting a first source persistence indicator from the first source message and extracting a first destination persistence indicator from the first destination message;
    associating a first source persistence indicator from the first source message with the first source message ID in the migration cache file; and
    associating a first destination persistence indicator from the first destination message with the first destination message ID in the migration cache file.

4. The method of claim 3, further comprising copying a plurality of source messages from the source mailbox to the destination mailbox,
    wherein the plurality of source messages includes the first source message,
    wherein all of the plurality of source messages are copied to the destination mailbox using the steps provided for the first source message to create a plurality of destination messages, and
    wherein the plurality of destination messages includes the first destination message.

5. The method of claim 4, further comprising:
    redirecting email traffic for the source mailbox to the destination mailbox; and
    performing a full update of the source mailbox to the destination mailbox when a plurality of source message IDs from the plurality of source messages and a plurality of destination message IDs from the plurality of destination messages are all persistent, wherein performing the full update comprises:
        selecting a first set of source messages in the source mailbox, each of the first set of source messages having a source message ID matching a stored source message ID in the message ID map;

reconciling one of the first set of source messages with a corresponding one of the plurality of destination messages, the one of the first set of source messages being mapped to the corresponding one of the plurality of destination messages by the message ID map;

repeating the reconciling for all of the first set of source messages; and copying all messages in the source mailbox not in the first set of source messages to the destination mailbox.

6. The method of claim 5, wherein reconciling comprises:

leaving a current set of destination message state indicator values for the corresponding one of the plurality of destination messages unchanged when the current set of destination message state indicator values do not match a corresponding set of stored source message state indicators mapped to the corresponding one of the plurality of destination messages; and copying a current set of source message state indicator values for the one of the first set of source messages to the corresponding one of the plurality of destination messages when the current set of destination message state indicator values do match the corresponding set of stored source message state indicator values and the current set of source message state indicator values do not match the corresponding set of stored source message state indicator values.

7. The method of claim 5, further comprising:

copying all messages in the source mailbox not in the first set of source messages to the destination mailbox when the plurality of source message IDs are persistent and a plurality of destination message IDs are not persistent;

removing a first set of destination messages from the destination mailbox and copying the plurality of source messages from the source mailbox to the destination mailbox when the plurality of source message IDs are not persistent and the plurality of destination message IDs are persistent, wherein each of the first set of destination messages has a destination message ID matching a stored destination message ID in the message ID map.

8. The method of claim 7, further comprising emptying the destination mailbox and copying the plurality of source messages from the source mailbox to the destination mailbox when the plurality of source message IDs and the plurality of destination message IDs are not persistent.

9. A method for migrating messages from a source mailbox on a source mail server to a destination mailbox on a destination server, the method comprising:

copying a first source message from the source mailbox to the destination mailbox to create a first destination message during a precopy operation, the first source message having a first source message ID and a first source persistence indicator value, and the first destination message having a first destination message ID and a first destination persistence indicator value;

enabling email client access to the source mailbox during the precopy operation to prevent email access downtime during actual copying of messages from the source mailbox to the destination mailbox; and creating a migration cache file, wherein creating the migration cache file comprises:

storing the first source message ID as a first stored source message ID in the migration cache file;

storing the first destination message ID as a first stored destination message ID in the migration cache file;

associating the first source message ID with the first destination message ID in a message ID map in the migration cache file;

storing the first source persistence indicator value as a first stored source persistence indicator value in the migration cache file; and storing the first destination persistence indicator value as a first stored destination persistence indicator value in the migration cache file.

10. The method of claim 9, further comprising:

copying a second source message from the source mailbox to the destination mailbox to create a second destination message, the second source message having a second source message ID and the first source persistence indicator value, and the second destination message having a second destination message ID and the first destination persistence indicator value, wherein creating the migration cache file further comprises:

storing the second source message ID as a second stored source message ID in the migration cache file;

storing the second destination message ID as a second stored destination message ID in the migration cache file; and associating the second stored source message ID with the second stored destination message ID in the message ID map.

11. The method of claim 9, wherein the source mailbox and the destination mailbox comprise IMAP mailboxes, wherein the first source persistence indicator value comprises a first UIDVALIDITY value, and wherein the first destination persistence indicator value comprises a second UIDVALIDITY value.

12. The method of claim 9, further comprising:

storing a first set of source message state indicator values from the first source message as a first set of stored message state indicator values in the migration cache file; and associating the first set of stored message state indicator values with the first stored source message ID.

13. The method of claim 12, further comprising copying a plurality of source messages from the source mailbox to the destination mailbox to create a plurality of destination messages, wherein the plurality of source messages includes the first source message, wherein the plurality of destination messages includes the first destination message, and wherein all of the plurality of source messages are copied to the destination mailbox using the steps provided for the first source message to create the plurality of destination messages.

14. The method of claim 13, further comprising:

redirecting email traffic for the source mailbox to the destination mailbox; and performing a full update of the source mailbox to the destination mailbox when a current source persistence indicator value of the plurality of source messages matches the first stored source persistence indicator value and a current destination persistence indicator value of the plurality of destination messages matches the first stored destination persistence indicator value, wherein performing the full update comprises:

selecting a first set of source messages in the source mailbox, each of the first set of source messages having a source message ID matching a stored source message ID in the message ID map;

reconciling one of the first set of source messages with a corresponding one of the plurality of destination messages, the one of the first set of source messages being mapped to the corresponding one of the plurality of destination messages by the message ID map;

repeating the reconciling for the first set of source messages; and copying all messages in the source mailbox not in the first set of source messages to the destination mailbox.

15. The method of claim 14, wherein reconciling comprises:

leaving a current set of destination message state indicator values for the corresponding one of the plurality of destination messages unchanged when the current set of destination message state indicator values do not match a corresponding set of stored source message state indicators mapped to the corresponding one of the plurality of destination messages; and copying a current set of source message state indicator values for the one of the first set of source messages to the corresponding one of the plurality of destination messages when the current set of destination message state indicator values do match the corresponding set of stored source message state indicator values and the current set of source message state indicator values do not match the corresponding set of stored source message state indicator values.

16. The method of claim 15, further comprising:

copying all messages in the source mailbox not in the first set of source messages to the destination mailbox when the current source persistence indicator value matches the stored source persistence indicator value and the current destination persistence indicator value does not match the stored destination persistence indicator value;

removing a first set of destination messages from the destination mailbox and copying the plurality of source messages from the source mailbox to the destination mailbox when the current source persistence indicator value does not match the stored source persistence indicator value and the current destination persistence indicator value matches the stored destination persistence indicator value, wherein each of the first set of destination messages has a destination message ID matching a stored destination message ID in the message ID map.

17. The method of claim 16, further comprising emptying the destination mailbox and copying the plurality of source messages from the source mailbox to the destination mailbox when the current source persistence indicator value does not match the stored source persistence indicator value and the current destination persistence indicator value does not match the stored destination persistence indicator value.

18. A non-transitory computer readable medium storing a software program, the software program being executable to provide operations comprising:

copying source message IDs from a plurality of source messages in a source mailbox on a source server into a migration cache file;

copying destination message IDs from a plurality of destination messages in a destination mailbox on a destination server into the migration cache file;

mapping the source message IDs to the destination message IDs in a message ID map in the migration cache file;

copying the plurality of source messages into the destination mailbox to create the plurality of destination messages instructions during a precopy operation;

enabling email client access to the source mailbox during the precopy operation to prevent email access downtime during actual copying of messages from the source mailbox to the destination mailbox;

extracting sets of source message state indicator values from the plurality of source messages; and associating the sets of source message state indicator values with the source message IDs in the migration cache file.

19. The non-transitory computer readable medium of claim 18, wherein the operations further comprise:

copying a source persistence indicator value from the source mailbox into the migration cache file; and copying a destination persistence indicator value from the destination mailbox into the migration cache file.

20. The non-transitory computer readable medium of claim 19, wherein the operations further comprise;

redirecting email traffic for the source mailbox to the destination mailbox; and updating the destination mailbox using the migration cache file once email traffic for the source mailbox is redirected to the destination mailbox.

21. The non-transitory computer readable medium of claim 20, wherein the operations further comprise:

checking for persistence of message identifiers of the source mailbox;

checking for persistence of message identifiers of the destination mailbox;

harmonizing the destination mailbox to the source mailbox when the source mailbox and the destination mailbox both support persistence of message identifiers;

copying source messages in the source mailbox not mapped in the message ID map to the destination mailbox when the source mailbox supports persistence of message identifiers and the destination mailbox does not support persistence of message identifiers; and deleting destination messages mapped in the message ID map from the destination mailbox and copying all source messages from the source mailbox to the destination mailbox when the source mailbox does not support persistence of message identifiers and the destination mailbox supports persistence of message identifiers.

22. The non-transitory computer readable medium of claim 21, wherein the operations further comprise emptying the destination mailbox and copying all source messages in the source mailbox to the destination mailbox when neither the source mailbox nor the destination mailbox supports persistence of message identifiers.

23. A method for migrating a source mailbox on a source mail server to a destination mailbox on a destination mail server, the method comprising:

copying a plurality of source messages in the source mailbox to the destination mailbox to create a plurality of destination messages during a precopy operation;

enabling email client access to the source mailbox during the precopy operation to prevent email access downtime during actual copying of messages from the source mailbox to the destination mailbox;

creating a message ID map of the plurality of source messages to the plurality of destination messages in a migration cache file;

storing a plurality of sets of message state indicator values from the plurality of source messages in the migration cache file;

redirecting email traffic for the source mailbox to the destination mailbox; and performing a one-way harmonization from the source mailbox to the destination mailbox based on the message ID map and the plurality of sets of message state indicator values in the migration cache file.

24. A system, comprising:
a computing device for migrating a source mailbox on a source mail server to a destination mailbox on a destination mail server, the computing device configured to:
copy a plurality of source messages in the source mailbox to the destination mailbox to create a plurality of destination messages during a precopy operation;
enable email client access to the source mailbox during the precopy operation to prevent email access downtime during actual copying of messages from the source mailbox to the destination mailbox;
copy a plurality of source message IDs from the plurality of source messages in the source mailbox into a migration cache file;
copy a plurality of destination message IDs from a plurality of destination messages into a destination mailbox on a destination server into the migration cache file;
map the plurality of source message IDs to the plurality of destination message IDs in a message ID map in the migration cache file;
extract a plurality of sets of source message state indicator values from the plurality of source messages; and
associate the plurality of sets of source message state indicator values with the plurality of source message IDs in the migration cache file.

25. The system of claim 24, wherein the computing device is further configured to:
copy a source persistence indicator value from the source mailbox into the migration cache file; and
copy a destination persistence indicator value from the destination mailbox into the migration cache file.

26. The system of claim 25, wherein the computing device is further configured to:
redirect email traffic for the source mailbox to the destination mailbox; and
update the destination mailbox using the migration cache file once email traffic for the source mailbox is redirected to the destination mailbox.

27. The system of claim 26, wherein the computing device is further configured to:
check for persistence of message identifiers of the source mailbox;
check for persistence of message identifiers of the destination mailbox;
harmonize the destination mailbox to the source mailbox when the source mailbox and the destination mailbox both support persistence of message identifiers;
copy source messages in the source mailbox not mapped in the message ID map to the destination mailbox when the source mailbox supports persistence of message identifiers and the destination mailbox does not support persistence of message identifiers; and
delete destination messages mapped in the message ID map from the destination mailbox and copying all source messages from the source mailbox to the destination mailbox when the source mailbox does not support persistence of message identifiers and the destination mailbox supports persistence of message identifiers.

28. The system of claim 27, wherein the computing device is further configured to
empty the destination mailbox; and
copy all source messages in the source mailbox to the destination mailbox when neither the source mailbox nor the destination mailbox supports persistence of message identifiers.

* * * * *